UNITED STATES PATENT OFFICE.

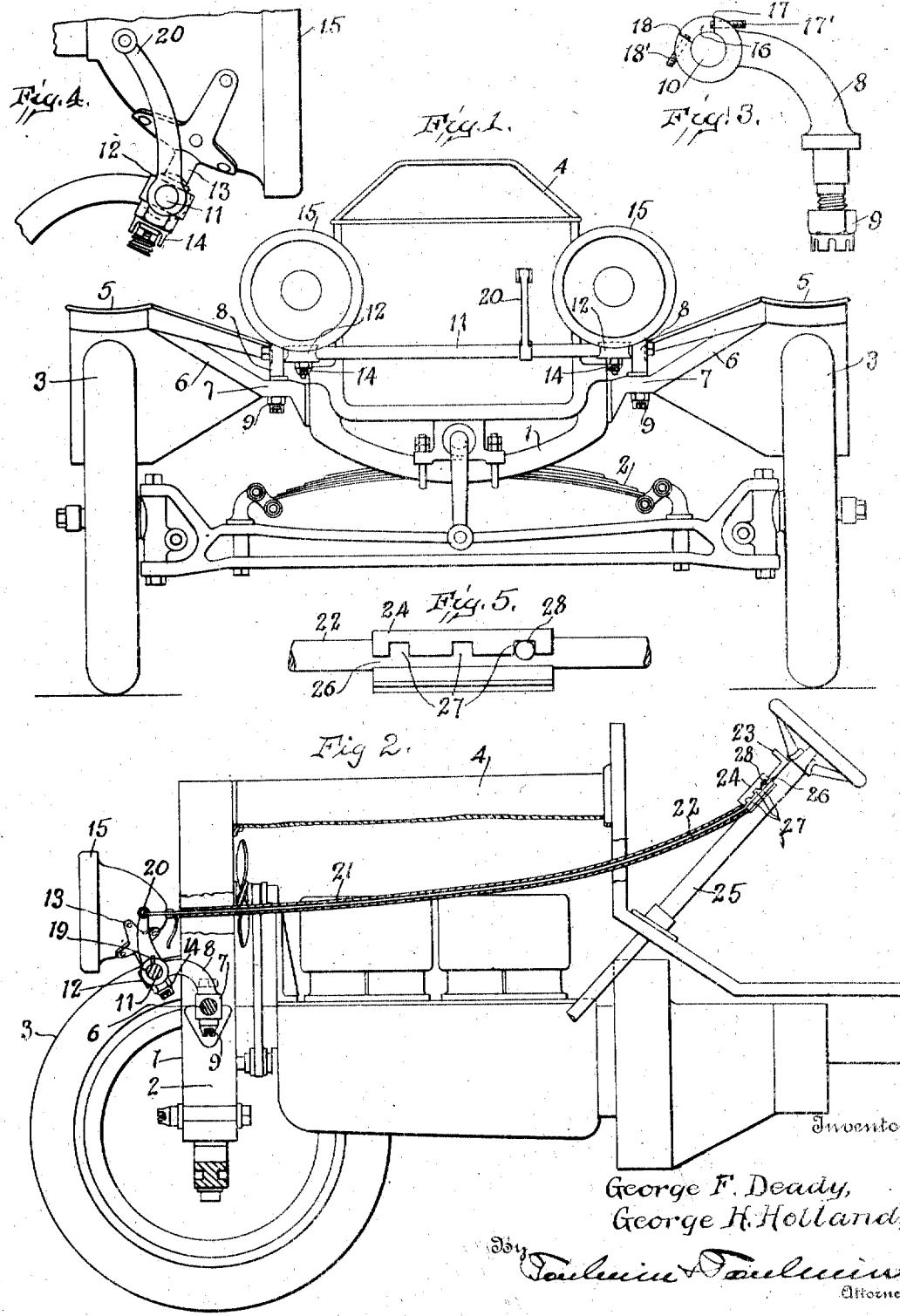

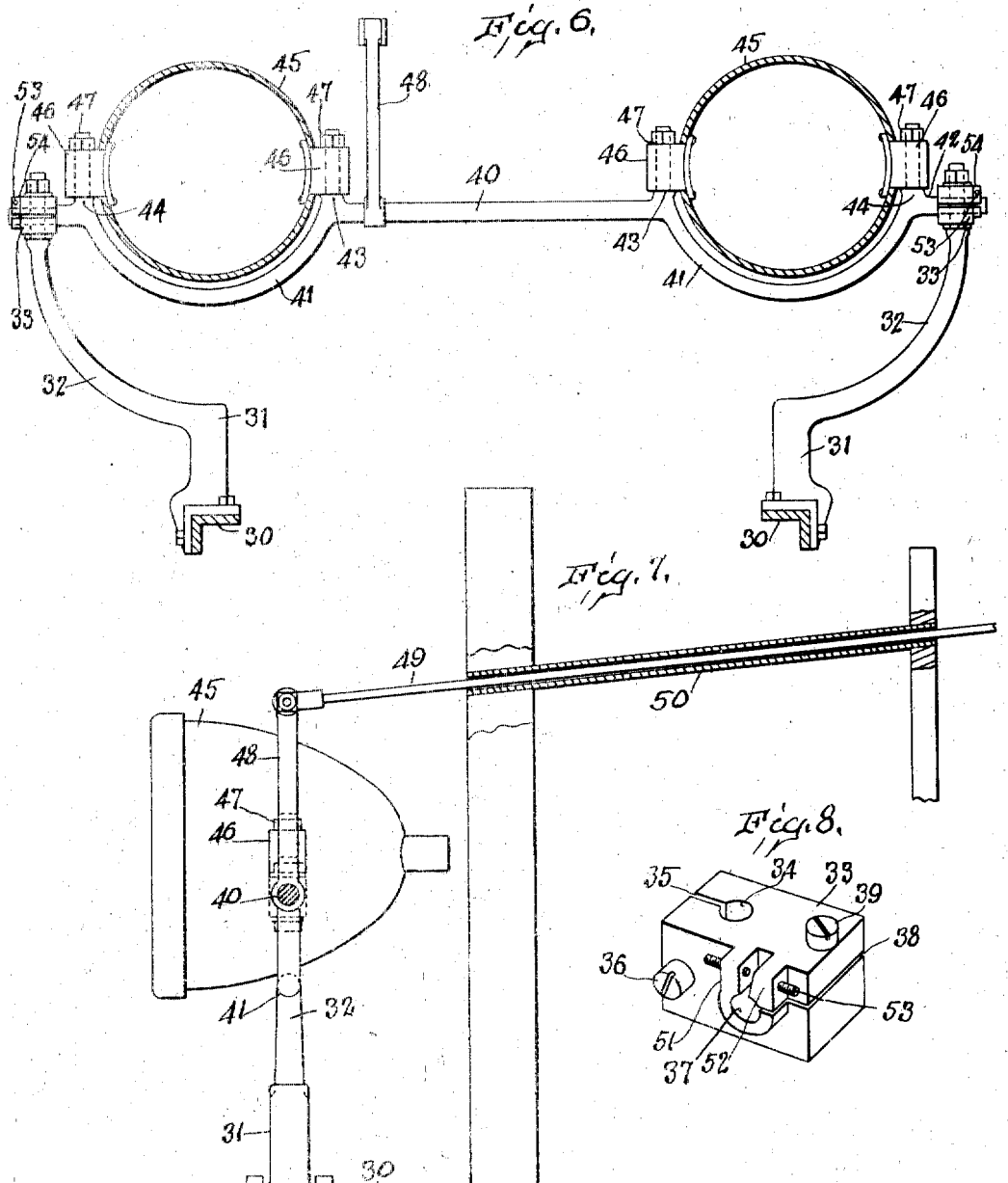

GEORGE F. DEADY AND GEORGE H. HOLLAND, OF DAYTON, OHIO, ASSIGNORS TO THE AUTO SAFETY LIGHT COMPANY, OF DAYTON, OHIO, A CORPORATION OF OHIO.

LIGHT FOR VEHICLES.

1,235,663.  Specification of Letters Patent.  Patented Aug. 7, 1917.

Original application filed October 28, 1916, Serial No. 128,194, Patent No. 1,230,080, dated June 12, 1917. Divided and this application filed February 16, 1917. Serial No. 149,050.

*To all whom it may concern:*

Be it known that we, GEORGE F. DEADY and GEORGE H. HOLLAND, citizens of the United States, residing at Dayton, in the county of Montgomery and State of Ohio, have invented certain new and useful Improvements in Lights for Vehicles, of which the following is a specification, reference being had therein to the accompanying drawing.

Our invention relates to lights for vehicles.

The object of our invention is to set the lights of a vehicle at any desired angle so that the light may shine fully upon the road way with the rays parallel to the road, or with the rays at an angle to the road, thus securing the effect of dimming the lights and at the same time brightly illuminating the roadway immediately in front of the vehicle.

The present practice of dimming such lights by a diffusion of the rays through a special lens or by covering a part of the lamp results in failure to properly illuminate the roadway, or prevents resumption of the full head light immediately after the use of the dim head light. Our invention permits of the immediate resumption of the full light without this necessity of removing the cover which dims the light. This is of special importance in road driving with an auto when it is essential to dim the lights upon passing another vehicle, and to resume the full brilliancy of the light quickly upon the passing of such vehicle. Again, it is important to be able to dim the lights while driving through a city, and to resume the full light upon entrance into the country. Both of these objects can be accomplished by our invention with great facility and promptness.

In particular it is the object of our invention to provide an apparatus which can be applied to cars already built and in the hands of the owner, by a simple removal of certain existing parts on the car as it comes from the manufacturer and the substitution of the parts of our apparatus in the same locations from which the old parts have been removed.

Particularly in Ford cars is this a very valuable feature. The owner can himself, or have an ordinary mechanic, remove the original lamp brackets on a Ford car which come with the machine, and substitute the brackets of our invention in the same holes from which the old brackets are removed. This can be done without special tools after the vehicle has left the factory. Our invention comprehends as one of its objects this adaptation of its parts to the requirements of the Ford car, and the restricted area of operation permitted on such a car and to the particular construction of that make of vehicle, all without a modification of the Ford car; it is simply a substitution of our apparatus embracing our invention for the parts already existing in that car, thus lending greatly to its utility and safety.

The present application is a division of our copending application filed Oct. 28th, 1916, Ser. No. 128,194 Patent 1,230,080, June 12, 1917.

In the accompanying drawings, Figure 1 is a front elevation embodying one form of the invention which is specially applicable to the Ford car; Fig. 2 is a side elevation of the same, partly in section; Fig. 3 is a detail view of a bracket adaptable for use in this connection; Fig. 4 is a detail view of one of the brackets for holding the lamp showing the manner of mounting the same; Fig. 5 is a view of the actuating mechanism for tilting the lamps which is mounted upon the steering post; Fig. 6 is a front elevation, partly in section, of a modified form of the invention which is applicable to any type of car; Fig. 7 is a side elevation of the same; and Fig. 8 is a detail perspective view of one of the bearings for supporting the lamps.

Ford cars as now built are generally provided with a curved transversely extending frame member 1 to which the springs 2 for supporting the wheels 3 are attached. The hood 4 is mounted above the frame 1 and attached thereto in any suitable manner. The car at each side is provided with fenders 5 which are suitably braced by means of the members 6 which are attached to the transversely extending member 1 and the fenders. The members or braces 6 are now constructed with apertured portions 7 which are adapted to receive the lights as now used on the Ford car. Our invention is directly applicable to the above described construction. To this end the brackets in use are replaced by the bracket 8 which is illustrated in Fig. 3. These brackets may be easily inserted in the apertured portion 7 and secured thereto by means of nuts 9. The brackets curve upwardly and forwardly and are provided with bearings 10 located in front of the hood. A transversely extending member or shaft 11 is journaled in the bearings and to this shaft is connected the illuminating devices or lamps. To this end the portion of the shaft between the bearings is provided with flattened apertured portions 12 adapted to receive the brackets 13. These brackets are secured to the shaft 11 by suitable nuts 14. The upper ends of these last-mentioned brackets have secured thereto the lamps 15. The general construction and arrangement above described is a very compact and simple one. The lamps, it will be seen, are located in the most suitable position away from all obstructions and the like. Furthermore, the old Ford lamps and their brackets may be here utilized if so desired. It is preferable, however, to cut off a portion of the bracket so that the lamps may be located as closely to the axis of rotation as practical, whereby vibration of the brackets and lamps will be in a great measure eliminated.

In order to limit the tilting movement of the lamps back and forth the bearings 10 are each provided with a recess 16 which has stops 17 and 18, as clearly shown in Fig. 3. The shaft 11 adjacent each of the brackets is provided with a pin 19 working within the recess 16. It will be seen that as the shaft is rotated back and forth the pin will engage the stops and limit the movement thereof. The play within the recess can be adjusted by means of set screws 17' and 18' which can be manipulated to determine the limits between which the lamps may be adjusted and which serve as stops for the pin 19. Fixed to the shaft 11 is an upwardly extending arm 20 which is connected by means of a resiliently flexible shaft 21 which is directed through the radiator and inclosed by a suitable conduit 22. The shaft 21 extends to a point adjacent the operator where it may be easily actuated. In the construction here shown it is provided with a suitable handle 23 working within a casing 24 mounted upon the steering post 25. The casing 24 is provided with a longitudinally extending slot 26 having suitable notches 27. The operating handle 23 has a pin 28 adapted to engage the notches whereby the lamps may be locked in horizontal, tilted, or intermediate position. When the operating handle is pulled back and forth to tilt the lamps it will be seen that the pin will slide back and forth in the slot 26 without interference.

The casing 24 is so arranged relatively to the shaft 21 that the resiliency of the latter may be utilized to hold it locked in the notches. In the position shown in the drawings the shaft is slightly twisted around its axis and there is a normal tendency to untwist due to the resiliency of the shaft. This untwisting is prevented by the portions of the casing containing the notches, whereby the pin is held securely in the notches. If it is desired to adjust the lamp the flexible shaft is rotated or rather twisted around its axis, whereby the pin is freed from its notch. A longitudinal movement is then given to the shaft in order to adjust the lamp. When the handle is again released the pin will spring quickly back into the appropriate notch by reason of the energy stored in the shaft resulting from the twisted or tensioned condition thereof.

Although the invention as here embodied is shown applied to a Ford car yet it is to be understood that it is of general application and can be used on any kind of a car or vehicle. The application thereof to other cars can easily be made by any skilled mechanic.

In Figs. 6 and 7, however, we have illustrated a modified form of the invention which is also adaptable to any form of car. In the construction shown in these figures the general frame-work of the vehicle is indicated at 30. Upon this frame-work are mounted the brackets 31. These brackets curve upwardly and outwardly, as indicated at 32, and are provided at their upper ends with suitable bearings 33 which may be of any construction.

As shown in Fig. 8, however, each bearing is provided with an opening 34 adapted to receive the upper end of the bracket 32 to which it is attached in any suitable manner. A slit 35 is provided whereby the tightness of the fit between the bearing and bracket may be adjusted by means of the set screw 36. Each of the bearings is also provided with a horizontally extending opening 37 which constitutes the journal of the transversely extending member for supporting the lamps. In order to allow for wear of the journaled parts the bearing is provided with a slit 38 connecting the opening 37 with the outside thereof, whereby the parts may be loosened or tightened by the set screw 39. The transversely extending member 40 for supporting the lamps is provided at each end thereof with a downwardly extending semiannular curved portion 41. The outer sides of these curved portions are provided with trunnions 42 projecting into the openings 37 of the bearings. The member is also provided at each end of the portions 41 with upwardly projecting pins 43 and 44 adapted to receive the lamps 45. These lamps are provided with suitable apertured lugs 46, whereby the same are supported by the pins and held in place by suitable nuts 47. The construction herein described is one characterized by simplicity and rigidity of the parts. It should be noticed that the lamps are mounted very close to the axis of the transversely extending member 40, whereby vibrations are practically eliminated. The lamps may be easily placed in position and removed when so desired. The member 40 is also provided with an upwardly extending arm 48 connected by a resiliently flexible shaft 49 directed through the conduit 50. The means for operating the device illustrated in Figs. 6 and 7 may be the same as that for operating the device shown in Figs. 1 and 2 and need no further description here. Means have also been provided herein for limiting the movements of the lamps around the axis, as in the form of device first described. This limiting means comprises a pair of stops 51 and 52 mounted upon the bearing 33. The throw of the lamps may be adjustably varied by means of the adjusting screws 53 as in the form above described. A pin 54 projects upwardly between the stops and adjusting screws and is adapted to engage the same in various positions.

While we have shown and described one embodiment of the invention and a modification thereof it will be understood that the same has been chosen for the purposes of illustration only, and that we do not desire to be limited to the details of construction shown and described, for obvious modifications will occur to a person skilled in the art.

Having thus fully described our invention, what we claim as new and desire to secure by Letters Patent, is:—

1. In an actuating device, a longitudinally movable flexible and resilient shaft, and a locking device associated with the operator's end of said shaft, the torsional resiliency of said shaft being utilized to keep the same in locked position.

2. In an actuating device, a flexible conduit, a longitudinally movable flexible and resilient shaft passing through said conduit, guided thereby and in sliding engagement therewith, a locking device associated with the operator's end of said shaft, the torsional resiliency of said shaft being utilized to keep the same in locked position.

3. In an actuating device, a tiltable lamp at one end of a longitudinally movable flexible and resilient shaft, a locking device associated with the other end of said shaft adjacent the operator, the torsional resiliency of said shaft being utilized to keep the shaft and lamp in any desired position.

4. In an actuating device, a longitudinally movable flexible and resilient shaft connected at one end to a tiltable lamp and passing through a flexible conduit with which it is in sliding engagement, a locking device associated with the operator's end of said shaft, the frictional engagement between said shaft and said conduit being utilized to keep the lamp and shaft in intermediate positions.

5. In an actuating device, a longitudinally movable flexible and resilient shaft connected with a tiltable lamp at one end and a bayonet locking device associated with the operator's end of said shaft, a flexible conduit through which said resilient shaft passes and which guides said shaft, whereby the resilient shaft is maintained in its proper position for both fore and aft movement to adjust said lamp.

In testimony whereof, we affix our signatures.

GEORGE F. DEADY.
GEORGE H. HOLLAND.